(12) United States Patent
Plunkett et al.

(10) Patent No.: US 7,622,876 B2
(45) Date of Patent: Nov. 24, 2009

(54) OVERLOAD PREVENTION DEVICE FOR PERMANENT MAGNET DC MOTORS

(75) Inventors: Larry Plunkett, Vernon Hills, IL (US); Greg Kolacinski, Capron, IL (US)

(73) Assignee: Danaher Motion, LLC, Marengo, IL (US)

( * ) Notice: Subject to any disclaimer, the term of this patent is extended or adjusted under 35 U.S.C. 154(b) by 242 days.

(21) Appl. No.: 11/461,170

(22) Filed: Jul. 31, 2006

(65) Prior Publication Data

US 2008/0024940 A1 Jan. 31, 2008

(51) Int. Cl.
*H02P 1/04* (2006.01)
(52) U.S. Cl. .................. 318/430; 318/432; 318/400.09; 361/23; 361/26
(58) Field of Classification Search ............... 318/400.9, 318/811, 430, 434, 432, 400.09; 361/23.25, 361/23, 26
See application file for complete search history.

(56) References Cited

U.S. PATENT DOCUMENTS

| | | | | |
|---|---|---|---|---|
| 4,902,039 A | | 2/1990 | Kawai et al. | |
| RE33,379 E | * | 10/1990 | Bradus | 388/812 |
| 4,961,880 A | * | 10/1990 | Barker | 252/644 |
| 5,218,282 A | | 6/1993 | Duhame | |
| 5,336,167 A | | 8/1994 | Sullivan et al. | |
| 5,345,126 A | * | 9/1994 | Bunch | 310/68 C |
| 5,627,710 A | * | 5/1997 | Schoeffler | 361/23 |
| 6,011,376 A | | 1/2000 | O'Bryan et al. | |
| 6,026,926 A | * | 2/2000 | Noro et al. | 180/446 |
| 6,064,165 A | | 5/2000 | Boisvert et al. | |
| 6,118,243 A | | 9/2000 | Reed et al. | |
| 6,201,369 B1 | * | 3/2001 | Johnson | 318/811 |
| 6,215,262 B1 | * | 4/2001 | Lim | 318/400.09 |

* cited by examiner

*Primary Examiner*—Paul Ip
(74) *Attorney, Agent, or Firm*—Locke Lord Bissell & Liddell (57) ABSTRACT

A method, apparatus or computer program implements an overload prevention approach involving monitoring a speed of a motor; detecting an overload condition of the motor based on the monitored speed; and controlling an operation of the motor according to the detected overload condition.

23 Claims, 9 Drawing Sheets

Program Code

```
'******************************************************************
'*  Name     : A-D Final                                          *
'*  Author   : Greg K and Larry P                                 *
'*  Notice   : Copyright (c) 2005 [select VIEW...EDITOR OPTIONS]  *
'*           : All Rights Reserved                                *
'*  Date     : 09/16/05                                           *
'*  Version  : 1.3                                                *
'*  Notes    : This version uses input voltage sensing to set     *
'*           : the value for speed sensing                        *
'*           : Also has chip to sense temperature                 *
'*           : Red Dot with P                                     *
'*                                                                *
'*                                                                *
'******************************************************************

'     PIC Defines
        '     -----------
        @ DEVICE pic12F683, INTRC_OSC_NOCLKOUT
                ' System Clock Options (Internal)
        @ DEVICE pic12F683, WDT_ON
                ' Watchdog Timer
        @ DEVICE pic12F683, PWRT_ON
                ' Power-On Timer
        @ DEVICE pic12F683, MCLR_OFF
                ' Master Clear Options (Internal)
        @ DEVICE pic12F683, BOD_ON
                ' Brown-Out Detect
        @ DEVICE pic12F683, CPD_OFF
                ' Data Memory Code Protect
        @ DEVICE pic12F683, PROTECT_OFF
                ' Program Code Protection '
        '     Hardware Defines
        '     ----------------
        define ADC_BITS 10         'A/D coverter uses 10  bits
        define ADC_SAMPLEUS 50     'A/D Sample time is 50 microsec
        define Pulsin_Max 120      'maximum pulse width is 1.2 ms
                                   'When monitoring pulse width, if no pulse
                                   'occurs within this lime a value of 0 is
                                   'reurned by the Pulsin command '
        '     Software Defines
        '     ----------------
        IntLimit var word          'The pulse width limit value
        OKtoRun var bit            'Can the actuator run?
        PulseTotal var word        'Width of the pulse
        ADVoltage var word         'A/D value for Input Voltage applied
                                   'Note, there is a voltage divider with a
                                   'zener diode to reduce the voltage to <=
                                   4.7 'Volts
        ADTemp var word            'AD Value of output of LM19 Temperature
                                   'Sensor
        TempComp var Word          'Temperature Compensation Factor
        i var byte                 'loop counter
        PulseSum var word          'Value of 12 pulse widths
```

FIG. 7

```
    Initialise PIC
'   ---------------
    CMCON0=7                        'comparators off
    ANSEL=%00010111                 'A/D 0,1,2,and 3 used.
                                    'Note A/D 3 is on gpio.4
                                    'gpio.3 is a dedicated digital input
    TRISIO=%00011111                'All inputs except gpio.5
'       wpu=%00011111               'all external pull-ups so wpu not needed
    ADCON0.7=1                      'A/D Values right justified
    ADCON0.0=1                      'A/D Converter operational 'End of microprocessor initialization, start of program gpio.5=1                        'Turn on the motor
    pause 500                       'Wait for 500 ms. This allows the motor
                                    'to come up to speed and the input voltage
                                    'to rebound if it dropped due to motor
                                    'starting current adcin 2,adtemp                  'Read the Temperature
    adtemp.lowbyte = ADRESL         'Read the low byte
    adtemp.highbyte = ADRESH        'Read the high byte
                                    'The LM19 output voltage is inversely
                                    'proportional to temperature.
                                    'The voltage versus temperature constant
                                    'is -0.0118 V per °C.
                                    'At room temp (25°C) the AD output is
                                    '1.515/5*1023 = 322
                                    'At -50°C the AD output is
                                    '2.485/5*1023=508
                                    'At +85°C the AD output is
                                    '0.851/5*1023=174
    if adtemp > 381 then            'Start compensation at 0°C
                                    'at -40°C the AD count is 474
        tempcomp=1                              'Temperature 0°C to -10°C
        if ADtemp>405 then tempcomp=2           'Temperature -10°C to -20°C
        if ADtemp>428 then tempcomp=3           'Temperature -20°C to -30°C
        if ADtemp>451 then tempcomp=4           'Temperature less than -30°C
    else
        tempcomp=0
    endif adcin 1, advoltage              'Read the input voltage
advoltage.lowbyte = ADRESL      'read the low byte
advoltage.highbyte = ADRESH     'read the high byte
intlimit=91+tempcomp*5                          'Pulse width for <9.5 V (5)
if advoltage>562 then intlimit=79+tempcomp*4    'Pulse width for >9.5 V (4.25)
if advoltage>621 then intlimit=67+tempcomp*4    'Pulse width for >10.5 V (3.5)
if advoltage>681 then intlimit=55+tempcomp*3    'Pulse width for >11.5 V (2.75)
if advoltage>740 then intlimit=51+tempcomp*3    'Pulse width for >12.5 V (2.5)
if advoltage>799 then intlimit=48+tempcomp*2    'Pulse width for >13.5 V (2)
if advoltage>858 then intlimit=45+tempcomp*2    'Pulse width for >14.5 V (1.5)
if advoltage>918 then intlimit=42+tempcomp*1    'Pulse width for >15.5 V (1)

'Example of Pulse width calculation:
'At 12 VDC the desired motor speed is
'   9000 RPM = 150 rev/sec
'   6 pulses per rev * 150 rev/sec = 900 Hz pulse rate
'   pulse period = 1 / 900 = 0.001111 seconds = 1111 microsec
'   pulse width = pulse period/ 2 = 1111 / 2 = 555 microsec
'   PIC senses in 10 microsec blocks to number to be used is 555/10 = 55
'
'Temperature compensation value is added for temperatures below 0°C
'
```

FIG. 8

```
oktorun = 1                     'Initialize Values
PulseTotal = 1 while OKtorun = 1               'Top of the main loop
'read width of one pulse from the hall effect and store the value in
'PulseTotal pulsin gpio.3,1,pulsetotal if pulsetotal =0 then           'Returned when maximum pulse width is exceeded
                                'See DEFINE at beginning of program for value
    oktorun=0                   'Stop Motor
else
    if pulsetotal > intlimit then   'Pulse is longer then allowed for the
                                    'voltage and frequency
        pulsesum=0
        for i = 1 to 12             'check for 2 complete motor
revolutions
            pulsin gpio.3,1,pulsetotal   'read the pulse width
            if pulsetotal =0 then oktorun=0 'if maximum pulse exceeded stop
            pulsesum=pulsesum+pulsetotal
        next
        pulsesum=pulsesum/12 + 1        'average pulse width
        if pulsesum>intlimit then
            oktorun=0                   'Stop Motor
        else
            oktorun=1
        endif
    else
        oktorun=1                       'Motor can keep running
    endif
endif
            'Note: the program stays inside the WHILE loop until OKtoRun
            'is not equal to one
wend gpio.5=0                        'Stop motor end
```

FIG. 9

OVERLOAD PREVENTION DEVICE FOR PERMANENT MAGNET DC MOTORS

FIELD OF THE INVENTION

The present invention relates to a method, system and apparatus for preventing overload conditions on motors and, more particularly, on permanent magnet DC electric motors such as used in linear or rotary actuators.

BACKGROUND

Traditionally, with motors, current is monitored in some way to prevent overloads. This may be a done with a thermally activated switch, commonly called a thermal protector. This device requires the overload condition to persist for some period of time to heat the thermal element, from several seconds to several minutes depending on the severity of the overload. It then requires a period of time to cool after the fault is removed before operation can resume. A second method uses a resistance element in series with the motor. The voltage across this resistor is proportional to the current and an electrical circuit can be design to shut off power to the motor when current flow exceeds a determined value. The disadvantage of this method is that power is dissipated in this resistance element which reduces overall system efficiency.

SUMMARY

In accordance with one embodiment, a method, apparatus or computer program implements an overload prevention approach involving monitoring a speed of a motor; detecting an overload condition of the motor based on the monitored speed; and controlling an operation of the motor according to the detected overload condition.

BRIEF DESCRIPTION OF THE DRAWINGS

FIGS. 7 through 9 illustrates source code for an exemplary method and process to prevent overload condition in the operation of a motor.

DETAILED DESCRIPTION OF THE VARIOUS EMBODIMENTS

In accordance with various aspects, there is provided an apparatus, system, method, computer product, computer program or the like to prevent an overload condition of a motor, for example, a permanent magnet DC electric motor such as used in linear or rotary actuators. The principal parameters of permanent magnet DC electric motors are linearly related, i.e. an increase in load torque results in a proportional decrease in motor speed and a proportional increase in motor input current. Any of the three characteristics can be measured to predict the state of the other two. Since motor speed in a permanent magnet DC motor is inversely proportional to motor current, speed is an accurate predictor of current. The speed of the motor (e.g., motor RPM or the like) therefore may be used as an indicator of load instead of current. Accordingly, a motor overload condition can be detected and preventive measures can be taken based on the speed of the motor and the monitoring thereof.

In accordance with an exemplary embodiment, an overload prevention approach may involve monitoring a speed of a motor, detecting an overload condition of the motor based on the monitored speed, and controlling an operation of the motor according to the detected overload condition. For example, at or below a speed threshold (e.g., a particular speed or the like), the power to the motor is shut off. The threshold(s) may be predefined (or predetermined) or adjusted, varied or determined dynamically based on a current operating conditions (or environment) of the motor, such as the ambient temperature, input voltage, current and so forth. Thus, the threshold may for example be a function of operating characteristics or environment (e.g., Threshold value=minimum speed (input voltage, temperature)). The threshold(s) may be ascertained at or before turning the motor on or during operation of the motor, as desired, and may be calculated or selected from a table or a combination thereof. Various exemplary overload prevention embodiments are discussed below in greater detail.

The utilization of speed in overload prevention can provide among other things various exemplary benefits and/or advantages. For example, the speed of a motor can be monitored through means that do not cause a reduction in efficiency, as compared to traditional methods. Exemplary non-contact configurations may entail the use electromagnetic sensor(s) such as a Hall Effect device in combination with a multi-pole magnet on a shaft of the motor, the use of optical sensor(s) and light techniques, and so forth. This can for example eliminate the reduction in efficiency as discussed above. The operation of the motor and its speed can return to normal as soon as the fault or condition is removed or resolved, so that reset delay such as associated with a thermal protector does not occur or is reduced. The speed of the motor can also be monitored continuously so the time to respond to a fault condition can be greatly reduced.

Furthermore, by way of example, the overload prevention configurations or embodiments described herein may be employed to address among other things: (1) mechanical overload (e.g., mid stroke stall or overload), (2) electrical overload (e.g., exceeding rated duty cycle), (3) end of stroke shut off (e.g., internal to the actuator or externally to the device being actuated), and so forth.

Figure 1:
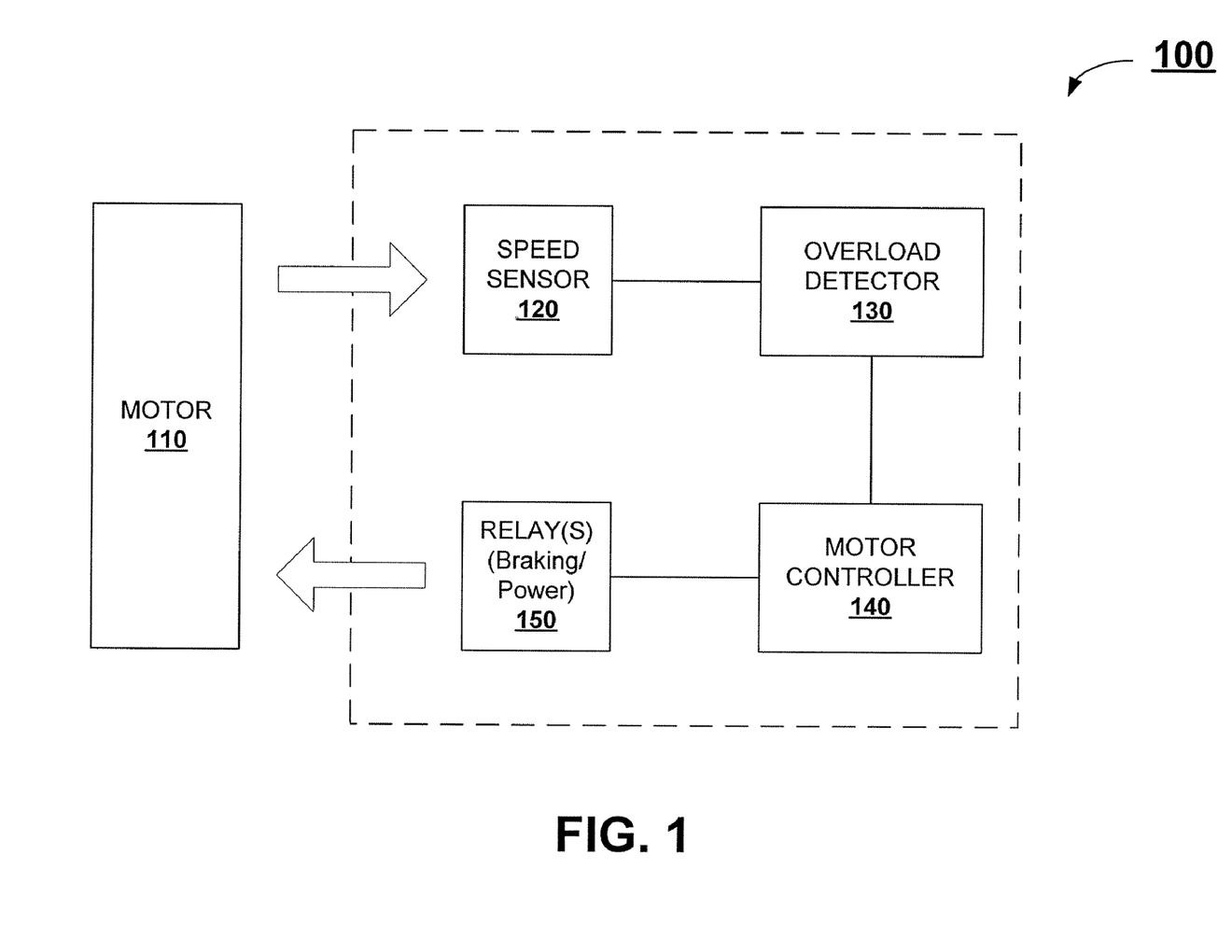
FIG. 1 illustrates an overview of an exemplary overload prevention device in accordance with an embodiment.

FIG. 1 illustrates an overview of a block diagram of an exemplary overload prevention device or system (hereinafter "device") 100 for a motor 110 in accordance with an embodiment. As shown, the overload prevention device 100 includes a sensor 120 for monitoring the speed of the motor 110; a detector 130 for detecting an overload condition of the motor 110 based on the monitored speed; a controller 140 for controlling the operation of the motor 110, and relay(s) 150 (e.g., switch(es), driving circuits, etc.) through which motor operation(s) may be controlled (e.g., suspended, resumed, turned or powered ON/OFF, braked, etc.).

The speed sensor 120 can be of a type which does not require or employ physical contact as part of the sensing or monitoring operations of the speed of the motor. For example, the speed sensor 120 may be a tachometer and may employ electro-magnetic sensing configuration, optical sensing configuration and so forth to monitor the speed of the motor 110. One example of an electromagnetic sensing configuration may be a Hall Effect device positioned or arranged to sense a multi-pole magnet arranged, for example, on the shaft of the motor 110. In this example to be discussed in further detail below, as the motor operates and the motor shaft and magnet thereon rotates, the Hall Effect device (or its switch(es)) outputs pulses in which the pulse widths reflect a speed of the motor. Instead of pulse widths, other measurement forms of speed may be employed, such as the frequency. The frequency may be determined from the pulse width over a period of time to reflect the speed of the motor. This is simply one example of a speed sensing configuration or sensor, and other configurations or sensors maybe employed to implement the overload prevention feature, as described herein.

Another type of speed sensing configuration may involve the use of optical sensors and light. For example, the speed sensor 120 can include an optical detector or optical encoder or the like to sense light representing a speed of a motor and to output a signal or information reflecting the speed. The optical detector can sense (1) light reflected from a component on the motor as it operates or (2) to sense light projected through slots or holes arranged with respect to the motor as it operates. In the first example, a reflective encoder or the like can be used in which an LED or other light source is shined at the motor or component thereon (e.g., similarly on the shaft) and reflected back to a photodetector such as a photodiode(s) or phototransistor(s) in order to obtain a speed characteristic of the motor. In the other example, an LED or other light is shined at slots or holes (arranged for example on or with respect to motor or component thereof) and detected by a photodetector such as a photodiode(s) or phototransistor(s) in order to obtain a speed characteristic of the motor.

As a further example, the speed sensor 120 can involve the use of a Reed switch(es) in combination with a magnet(s) to detect the speed of the motor during operation thereof. The Reed switch example may be employed in lower speed motor configurations. The following are simply examples of various speed sensing configurations, and other speed sensing configurations may be employed to implement the overload prevention feature described herein.

The various components and processes of the overload prevention device 100, as described above, may further be implemented through one or more processors executing computer readable code (e.g. program, software or firmware, etc.), hardwire or integrated or logic circuitry, or a combination thereof. The computer readable code may be stored in a tangible memory medium and read and executed to implement the overload prevention feature described herein.

Figure 2:
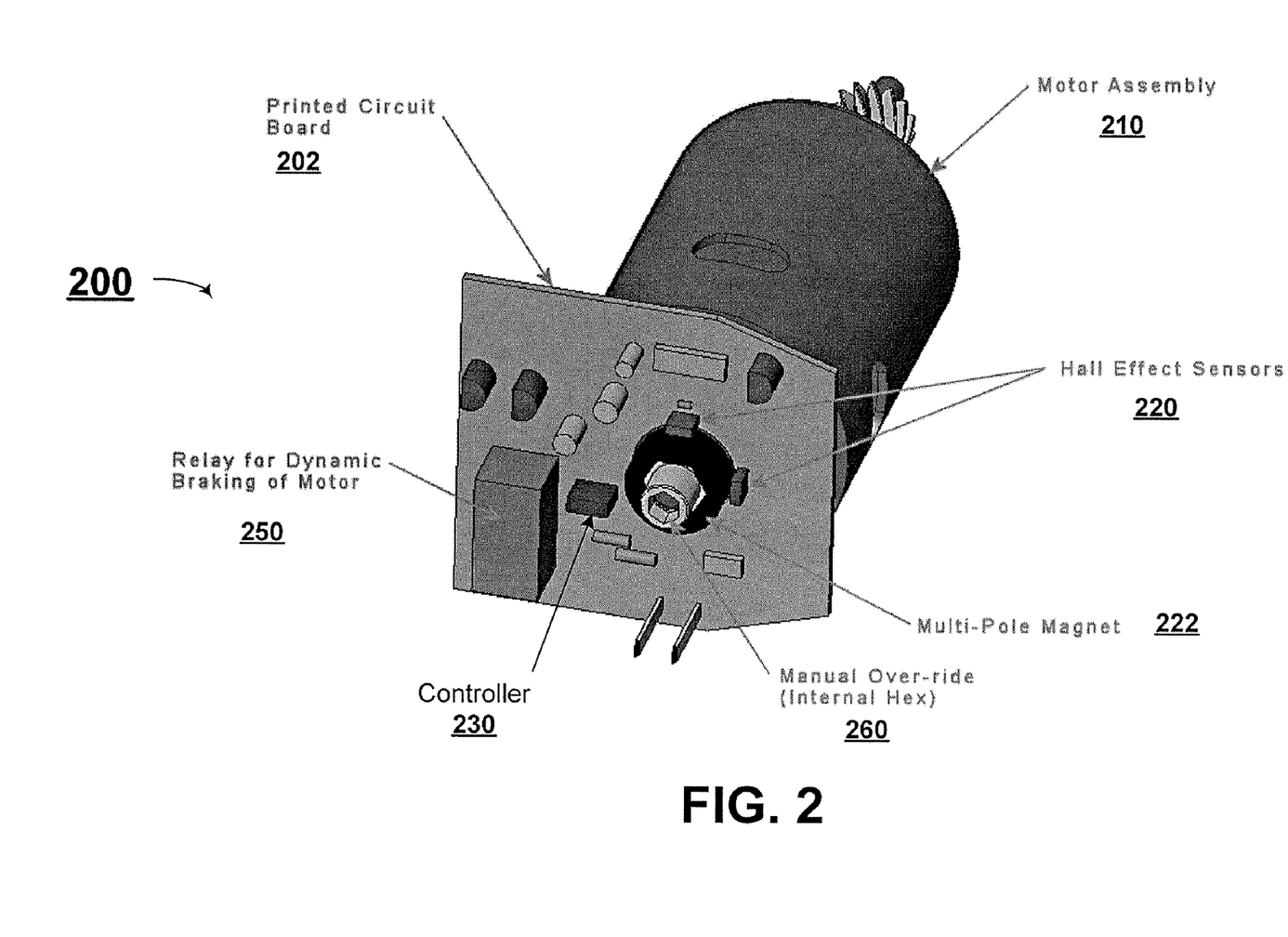
FIG. 2 illustrates an overview of an exemplary overload prevention device in accordance with a further embodiment.

FIG. 2 illustrates an overview of a block diagram of an exemplary overload prevention device 200 for a motor (or motor assembly) 210 in accordance with a further embodiment. As shown, the overload prevention device 110 may include Hall Effect sensors 220 (e.g., Hall Effect switches), a controller 230 for implementing various overload prevention functions and features such as described herein, and a relay 250 for dynamic braking of the motor 210. In this example, these components of the device 200 are arranged on a printed circuit board 202.

The Hall Effect sensors 220 are positioned to read the magnetic field from a multi-pole magnet 222 arranged or connected on a shaft of the motor 210 in order to rotate at the speed of the motor. The magnet 222 can be a 12 pole or 6 pole pair magnet arrangement which is fixed to the shaft of the motor 210. In operation, the magnet 222 energizes the Hall Effect switch(es) each time a south pole passes the face of the Hall Effect switch(es) of the sensors 220. The resulting width of the pulse or pulse width outputted by the sensors 220 reflect the speed (e.g., RPM) of the motor 210.

The controller 230 may include a microprocessor(s) or microcontroller(s) which obtains the monitored speed, detects an overload condition of the motor based on the monitored speed, and controls an operation of the motor according to the detected overload condition. For example, at or beyond a speed threshold (e.g., predetermined speed value or the like), the power to the motor is shut off such as via the relay 250 or other relay(s) or motor driving circuits or components.

Also shown in FIG. 2 is a manual over-ride feature or configuration 260 which may be used to manually rotate or operate or move the shaft or components connected thereto, for example, in the event of overload or fault or breakdown or power failure or so forth.

Although FIG. 2 describes one example employing particular components and configuration of these components, these and/or other components and arrangements may be employed to monitor an overload condition according to the speed of the motor. For example, as noted above, a sensor other than Hall device switches may be used such as optical sensors and so forth. The type of sensor may be selected for example based on the motor application and operating conditions of the motor.

Figure 3:
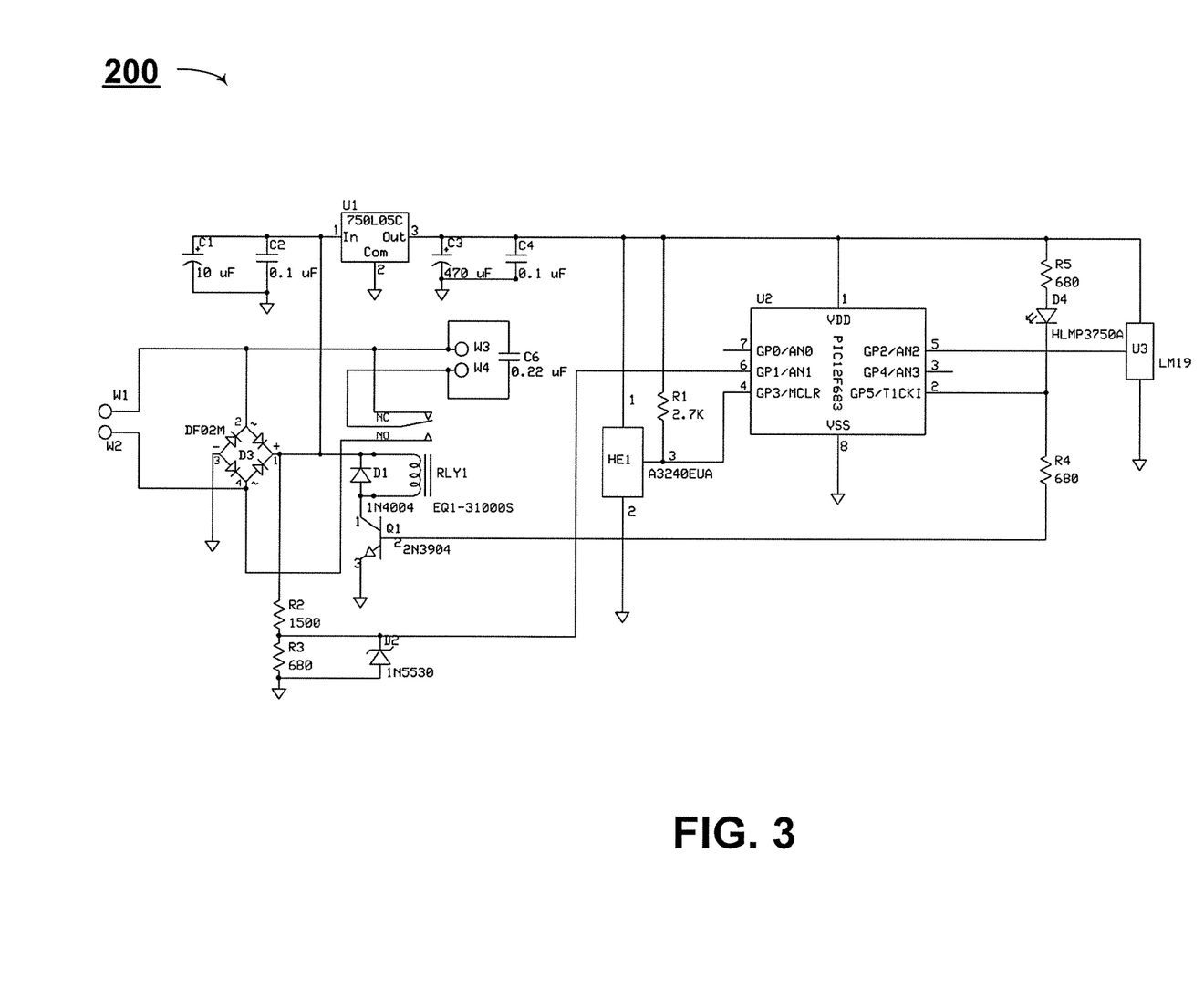
FIG. 3 illustrates a circuit diagram of an exemplary circuit layout of an overload prevention device of FIG. 2 in accordance with an embodiment.

FIG. 3 illustrates a circuit diagram of an exemplary circuit layout of an exemplary overload prevention device 200 of FIG. 2 in accordance with an embodiment. As shown, the overload prevention device 200 includes terminals W1 through W4, capacitors C1 through C4, C5, resistors R1 through R5, diodes D1 and D2 and D4, full-wave bridge (or rectifier) D3, relay RLY1, voltage regulator U1, microprocessor U2, temperature sensor U3, transistor Q1 and Hall Effect device or switch HE1.

The terminals W1 and W2 provide for the application of power. Terminal W1 is positive for one direction of motor rotation and negative for the reverse direction. This voltage is applied to the input of the full-wave bridge D3 as well as to the contacts of the single-pole double-throw relay RLY1. The full-wave bridge D3 provides voltage of the proper polarity to the control circuit of the device 200 regardless of the input polarity.

The resistors R2 and R3 form a voltage divider. The values of the resistors may be chosen to provide a desired voltage, e.g., voltage of 5 volts or less, across resistor R3. A zener diode D2 is used to assure that the voltage does not exceed the input voltage to a microprocessor U2. The voltage across the resistor R3 is proportional to the input voltage applied to the actuator and is used to monitor the input voltage. As will be described below in greater detail, the input voltage may be obtained or read to vary or adjust or determine a speed threshold (or limit) value used for detecting an overload condition The capacitors C1 and C2 are used to stabilize the voltage supply to the input of a voltage regulator U1.

The diode D1 prevents excessive voltage caused by the inductance of the relay coil RLY1 when it is switched off. Transistor Q1 is used to turn the relay coil RLY1 on and off according to signals applied to the base of the transistor through resistor R4.

The output of the voltage regulator U1 is filtered by the capacitors C3 and C4. This provides a stable voltage supply to the microprocessor U2 and the Hall Effect switch HE1. The Hall Effect switch HE1 provides an output pulse each time a pole of the magnet passes it. The pulse width is proportional to the rotational speed of the motor.

Resistor R5 limits the current flow to light-emitting diode (LED) D4. The diode D4 is illuminated when the control circuit of the microprocessor turns off the motor, e.g., in the case of an overload condition.

Figure 9:
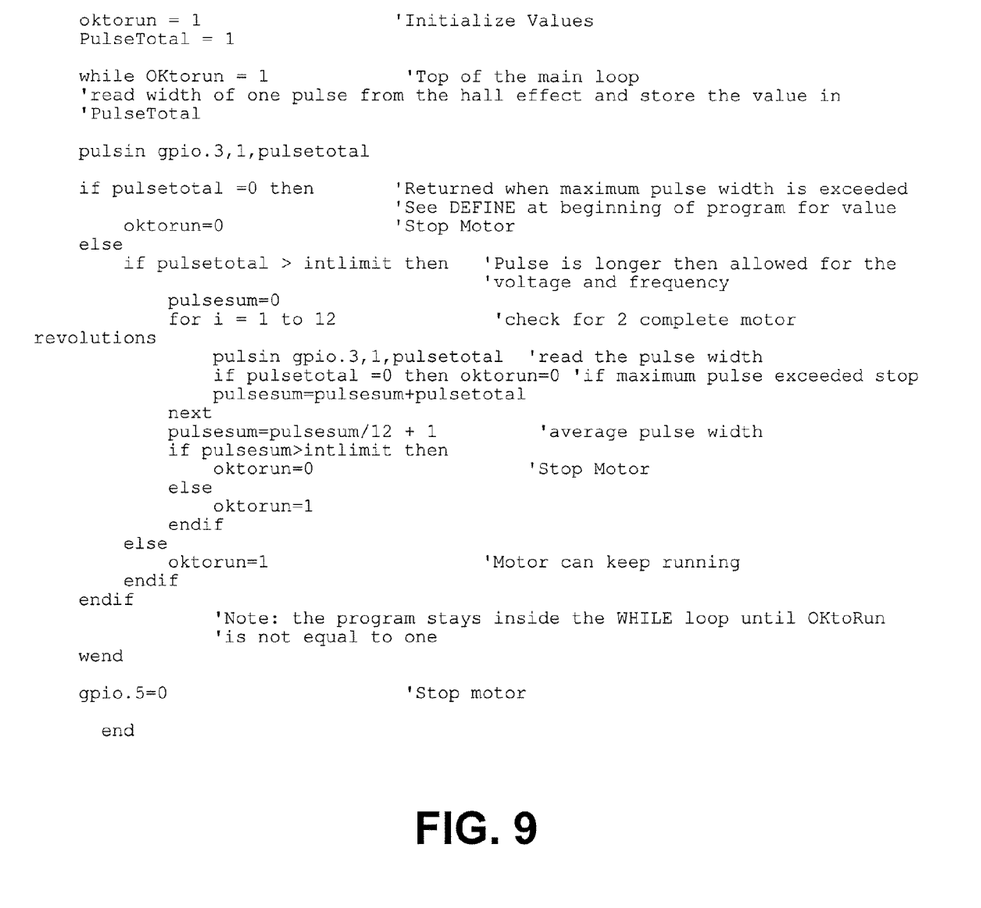

Temperature sensor U3 is used to monitor the ambient temperature (e.g., an ambient temperature value). Since the actuator may operate under widely varying temperature conditions, the overload prevention implementation may take into account the ambient temperature. As will be described below in greater detail, the ambient temperature may be obtained or read to vary or adjust or determine a speed threshold (or limit) value used for detecting an overload condition The exemplary functions and features controlled by the microprocessor U2 will now be discussed below with reference to the source listing of FIGS. 7-9 which describe an exemplary process(es) or program(s) implementable through one or more processors to provide overload prevention.

For example, when power is first applied to the microprocessor U2, the output GP5 is made HIGH. This turns on transistor Q1, which energizes the relay coil RLY1. The contacts of the relay RLY1 close, thereby applying power to the motor of the actuator, e.g., across terminals W3 and W4 (connectable to the motor) which has the capacitor C6 connected across to suppress noise. This is maintained for a predetermined time, such as 0.5 seconds. This predetermined time may be selected so that, for example, the motor can come up to speed and the input voltage can rebound if it dropped due to the motor starting current.

At this point the input voltage is read by an analog to digital (A/D) converter in the microprocessor U2. The value of the output of the analog to digital (A/D) converter is converted mathematically to the minimum pulse width allowed.

The width of each output pulse from the Hall Effect device is measured. If there is no change in the pulse it can be assumed that the motor is not rotating and the power to the motor is turned off. The width of the pulse is compared to a speed threshold which may be established by a base RPM value and, if desired, also corrected or compensated for input voltage and ambient temperature. If the pulse width is less than the threshold value (e.g., the motor speed is greater than or equal to the threshold speed), then the motor operation continues. If the pulse width is greater than the threshold value (e.g., the motor speed is less than the threshold speed), the microprocessor U2 averages the width of the next twelve pulses. If the average pulse width is greater than the threshold (e.g., the average motor speed is less than the threshold speed), the motor is turned off. The operation of the motor continues until power is removed or motor speed drops below the minimum value. The motor can be turned off by turning off transistor Q1 to control the relay RLY1 to open the contacts thereby removing power to the motor.

Figure 4:
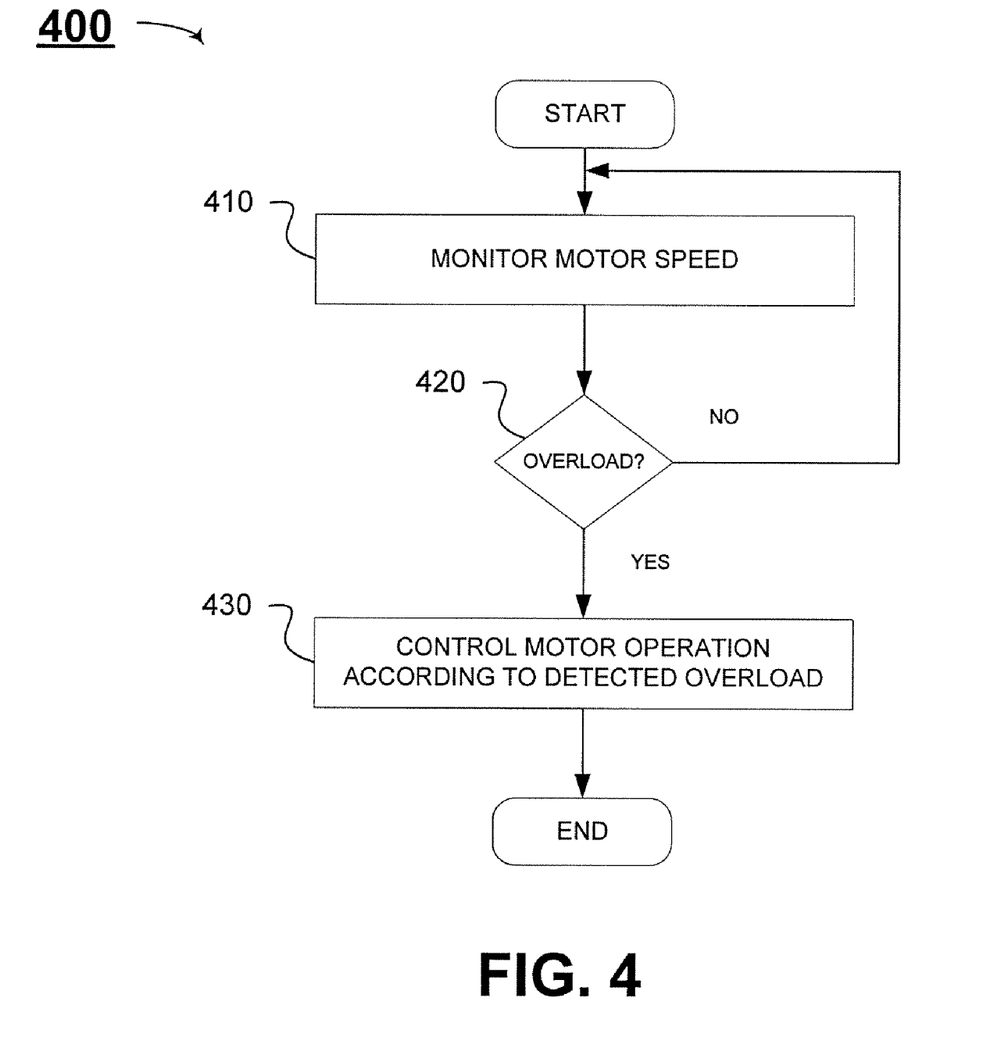
FIG. 4 illustrates a flow diagram of an exemplary process by which overload of a motor is prevented in accordance with an embodiment.

FIG. 4 illustrates a flow diagram of an exemplary process 400 by which overload of a motor is prevented in accordance with an embodiment. This process may be implemented by an overload prevention device, such as devices 100 or 200, or its components.

The process 400 monitors the speed of a motor at step 410. At step 420, the overload prevention device detects whether an overload condition exists (or does not exist) based on the monitored speed. This may involve, for example, comparing the monitored speed or an average of the monitored speed (over a period of time or a number of measurements) to a threshold (or limit). For instance, if the monitored speed is less than the speed threshold, then an overload condition exists. The value of the threshold and the manner of comparison (e.g., less than, equal to, and/or greater than) may also be dependent on whether a pulse width, frequency or other characteristic is used to monitor and compare the speed. Further, the threshold may be varied, adjusted or determined based on the operating environment of the motor, such as ambient temperature, input voltage, current, or other motor characteristics or environmental factors, which may affect the operation of the motor, or a combination thereof.

If an overload condition is detected, the overload prevention device controls the motor operation accordingly, such as turns off, powers off, suspends and so forth the motor. Once the overload condition is resolved or remedied, the motor may be turned on or powered up or motor operations may be resumed along with the overload prevention feature. Otherwise, the process 400 proceeds to step 410 to continue monitoring the speed.

Figure 5:
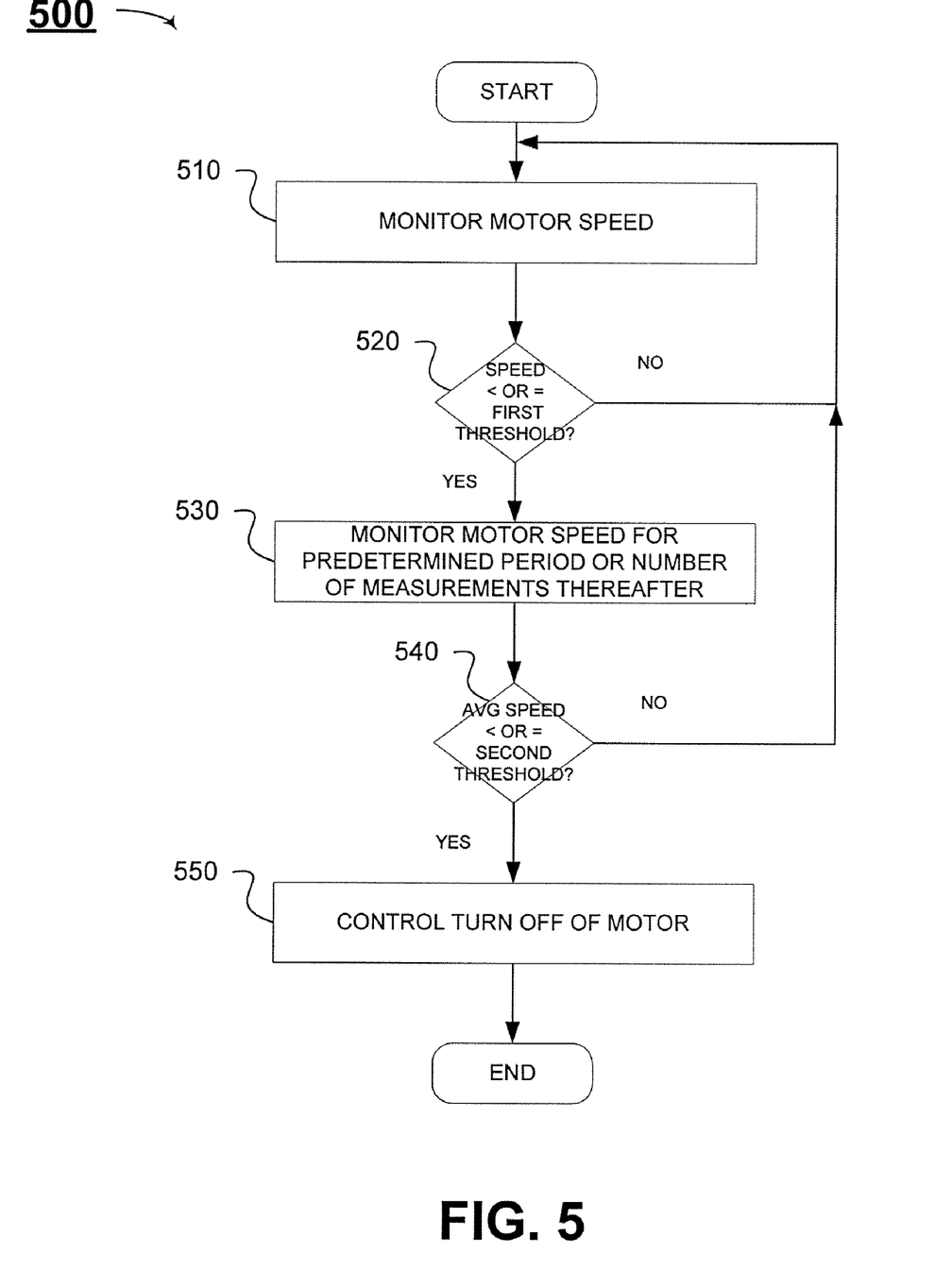
FIG. 5 illustrates a flow diagram of an exemplary process by which overload of a motor is prevented in accordance with an embodiment.

FIG. 5 illustrates a flow diagram of an exemplary process 500 by which overload of a motor is prevented in accordance with an embodiment. This process may be implemented by an overload prevention device, such as devices 100 or 200, or its components.

The process 500 monitors the speed of the motor at step 510. The overload prevention device thereafter detects whether an overload condition exists (or does not exist) based on the monitored speed. For example, at step 520 the overload prevention device compares the monitored speed to a first speed threshold. If the monitored speed is not less than or equal to the first speed threshold, then the process 500 proceeds back to step 510. Otherwise, if the monitored speed is less than or equal to the first speed threshold, then the overload prevention device monitors motor speed for a predetermined period or a predetermined number of measurements thereafter at step 530. The overload prevention device stores the monitored speed (including or not including the initial speed measurement in step 510), and calculates an average speed over a period of time or a number of measurements. At step 540, the overload prevention device determines whether the average speed is less than or equal to the second speed threshold. The first and second speed thresholds may be the same or different. If the average speed is not less than or equal to the second speed threshold, then the process 500 proceeds to step 510.

Otherwise, if the average speed is less than or equal to the second speed threshold, then the overload prevention device has detected an overload condition and controls the turn off of the motor accordingly at step 550. Once the overload condition is resolved or remedied, the motor may be turned on or powered up or motor operations may be resumed along with the overload prevention feature.

The value of the first and second thresholds and the manner of comparison (e.g., less than, equal to, and/or greater than) may be dependent on whether a pulse width, frequency or other characteristic is used to monitor and compare the speed. Further, the thresholds may be varied, adjusted or determined based on the operating environment of the motor, such as ambient temperature, input voltage, current or other motor characteristics or environmental factors, which may affect the operation of the motor, or a combination thereof.

Figure 6:
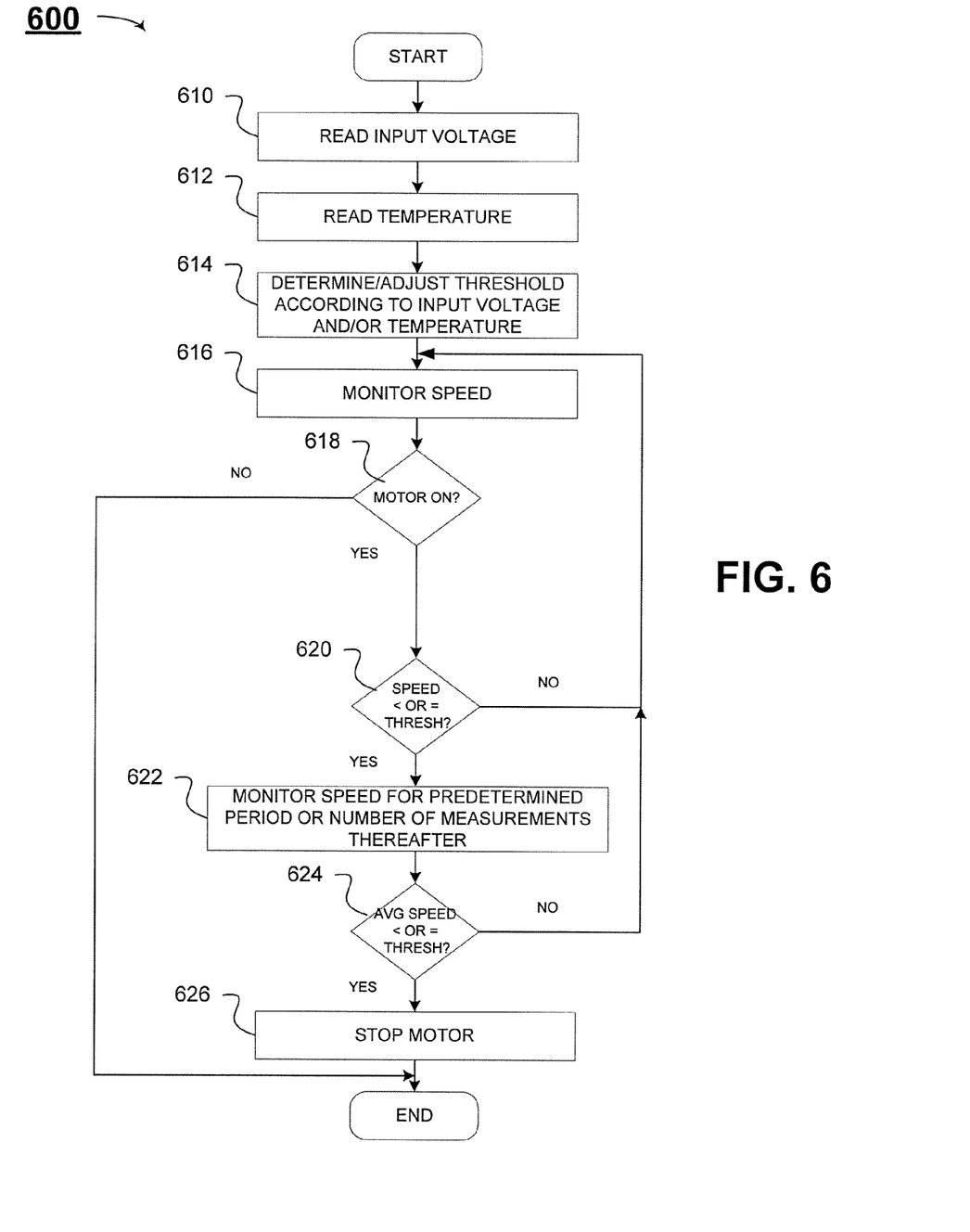
FIG. 6 illustrates a flow diagram of an exemplary process by which overload of a motor is prevented in accordance with an embodiment.

FIG. 6 illustrates a flow diagram of an exemplary process 600 by which overload of a motor is prevented in accordance with an embodiment. This process may be implemented by an overload prevention device, such as devices 100 or 200, or its components.

The process 600 reads the input voltage at step 610 and reads the temperature at step 612. At step 614, the speed threshold(s) is determined or adjusted according to operating conditions, such as the input voltage and/or the temperature. The speed threshold(s) may be calculated or obtained from a lookup table or the like or a combination thereof.

At step 616, the speed of the motor is monitored. At step 618, the overload prevention device determines whether the motor is on or operating based on the speed. For example, when a pulse width output of a Hall-Effect sensor is used to measure the speed of a motor, the overload prevention device may determine that the motor is off or not operating if there is no change (e.g., no pulse). If the motor is off, then the process 600 is terminated. Otherwise, if the motor is on, the overload prevention device compares the monitored speed to a speed threshold at step 620. If the monitored speed is not less than or equal to the speed threshold, then the process 600 proceeds back to step 616. Otherwise, if the monitored speed is less than or equal to the speed threshold, then the overload prevention device monitors the motor speed for a predetermined period or a predetermined number of measurements thereafter at step 622. The overload prevention device stores the monitored speed (including or not including the initial speed measurement in step 616), and calculates an average speed over a period of time or a number of measurements. At step 624, the overload prevention device determines whether the average speed is less than or equal to the speed threshold. In this example, the same speed threshold is used in steps 620 and 624 but may be different if desired. If the average speed is not less than or equal to the second speed threshold, then the process 600 proceeds to step 616.

Otherwise, if the average speed is less than or equal to the second speed threshold, then the overload prevention device has detected an overload condition and controls the turn off of the motor accordingly at step 626. Once the overload or fault condition is resolved or remedied, the motor may be turned on or powered up or motor operations may be resumed along with the overload prevention feature.

The value of the threshold and the manner of comparison (e.g., less than, equal to, and/or greater than) may be dependent on whether a pulse width, frequency or other characteristic is used to monitor and compare the speed. Further, the thresholds may be varied, adjusted or determined based on the operating environment of the motor, such as ambient temperature, input voltage, current or other motor characteristics or environmental factors, which may affect the operation of the motor, or a combination thereof.

Although the above FIGS. 4 through 6 describe exemplary processes for preventing overload of a motor, the overload prevention feature is not limited to the particular steps, order of steps or implementation described in these examples. The various aspects such as described in these FIGS. 4 through 6 and generally herein including among other things the particular type of speed measurement, the threshold, the number of comparisons to the threshold and so forth may be selected as desired. The various processes may be implemented through one or more processors executing computer readable code (e.g. program, software or firmware, etc.), hardwire or integrated or logic circuitry, or a combination thereof.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents. Thus, other motor types are within the scope of the present invention.

What is claimed is:

1. A method comprising:
monitoring a speed of a motor;
detecting a load condition of the motor based on the monitored speed to determine the detecting comprising comparing the monitored speed to a first speed threshold and depending on the comparison calculating an average speed over time or over a number of speed measurements and determining whether the load condition exists or not based on a comparison of the calculated average speed to an average speed threshold; and
controlling an operation of the motor according to the detected load condition.

2. The method according to claim 1, wherein the detecting operation detects the existence of the load condition when the calculated average speed is less than the average speed threshold which reflects a minimum operating speed.

3. The method according to claim 1, wherein the first threshold or the average speed threshold is adjusted according to an input voltage and/or ambient temperature.

4. The method according to the claim 1, wherein the monitoring operation generates a pulse having a pulse having a width that reflects a speed of the motor, and the comparing operation compares the width of the generated pulse to the first threshold.

5. The method according to claim 1, wherein the monitoring operation generates pulses having widths that reflect a speed of the motor, and the comparison operation compares an average width of the plurality of generated pulses over a predetermined period or number of measurements to the average speed threshold to determine whether the load condition exists or not.

6. The method according to claim 1, wherein the monitoring operation monitors the speed of the motor with a non-contact sensor configuration.

7. The method according to claim 6, wherein the non-contact sensor configuration comprises a hall-effect device arranged to sense magnet field generated by a magnet connected to a shaft of the motor.

8. The method according to claim 6, wherein the non-contact sensor configuration comprises an optical sensor.

9. The method according to claim 1, wherein the controlling prevents operation of the motor while the load condition persists.

10. The method according to claim 1, wherein the load condition comprises and end of stroke of the motor.

11. The method according to claim 1, wherein the load condition comprises a mid stroke stall or overload.

12. An apparatus comprising:
a sensor for monitoring a speed of a motor;
a detector module for detecting a load condition of the motor based on the monitored speed to determine a stroke state of the motor, the detector module comparing the monitored speed to a first speed threshold and depending on the comparison calculating an average speed over time or over a number of speed measurements and determining whether the load condition exists or not based on a comparison of the calculated average speed to an average speed threshold;
a control module for controlling an operation of the motor according to the detected load condition.

13. The apparatus according to claim 12, wherein the detector module detects the load condition when the calculated average speed is less than the average speed threshold, which reflects a minimum operating speed.

14. The apparatus according to claim 12, wherein the first threshold or the average speed threshold is adjusted according to an input voltage and/or ambient temperature.

15. The apparatus according to claim 12, wherein the sensor generates a pulse having a width that reflects a speed of the motor, and the detector module compares the width of the generated pulse to the first threshold.

16. The apparatus according to claim 12, wherein the sensor generates pulses having widths that reflect a speed of the motor, and the detector module compares an average width of the plurality of generated pulses over a predetermined period or number of measurements to the average speed threshold to determine whether the load condition exists or not.

17. The apparatus according to claim 12, wherein the sensor monitors the speed of the motor with a non-contact sensor configuration.

18. The apparatus according to claim 17, wherein the non-contact sensor configuration comprises a hall-effect device that senses the magnetic field of a magnet connected to a shaft of the motor.

19. The apparatus according to claim 17, wherein the non-contact sensor configuration comprises an optical sensor.

20. The apparatus according to claim 12, wherein the controller module prevents operation of the motor while the load condition persists.

21. The apparatus according to claim 20, further comprising a relay to turn off the motor when the load condition is detected based on a command from the controller module.

22. The apparatus according to claim 12, further comprising a printed circuit board including the detector and controller modules.

23. A tangible computer medium having computer executable code which when executed by a processor performs the following method:
monitoring a speed of a motor;
detecting a load condition of the motor based on the monitored speed to determine a stroke state of the motor, the detecting comprising comparing the monitored speed to a first speed threshold and depending on the comparison calculating an average speed over time or over a number of speed measurements and determining whether the load condition exists or not based on a comparison of the calculated average speed to an average speed to an average speed threshold; and
controlling an operation of the motor according to the detected load condition.

* * * * *

UNITED STATES PATENT AND TRADEMARK OFFICE
CERTIFICATE OF CORRECTION

PATENT NO. : 7,622,876 B2
APPLICATION NO. : 11/461170
DATED : November 24, 2009
INVENTOR(S) : Larry Plunkett et al.

Page 1 of 1

It is certified that error appears in the above-identified patent and that said Letters Patent is hereby corrected as shown below:

In the Claims:
Column 8

In claim 1, Line 5, "to determine the detecting" should read, --to determine a stroke state of the motor, the detecting--;

In claim 10, Line 47, "condition comprises and end" should read, --condition comprises an end--.

Signed and Sealed this

Fourteenth Day of December, 2010

David J. Kappos
*Director of the United States Patent and Trademark Office*